United States Patent [19]

Carey et al.

[11] Patent Number: 4,660,117
[45] Date of Patent: Apr. 21, 1987

[54] DISK CARTRIDGE HAVING A FLEXIBLE DISK STORAGE MEDIUM AND A DISK FILE INCLUDING SUCH A CARTRIDGE

[75] Inventors: Paul D. Carey, Romsey; Stanley J. Cutts, Winchester; John S. Heath, Winchester; David E. White, Winchester; David A. Evans, Winchester, all of England

[73] Assignee: International Business Machines Corporation, Armonk, N.Y.

[21] Appl. No.: 676,358

[22] Filed: Nov. 29, 1984

[30] Foreign Application Priority Data

Dec. 21, 1983 [EP] European Pat. Off. ........ 83307800.9

[51] Int. Cl.$^4$ .................. G11B 23/03; G11B 15/64; G11B 17/32
[52] U.S. Cl. ................................. 360/133; 360/99; 360/102
[58] Field of Search .............. 360/86, 99, 102, 133, 360/135; 369/261

[56] References Cited

U.S. PATENT DOCUMENTS

| | | | |
|---|---|---|---|
| 3,932,710 | 1/1976 | Dickopp et al. | 360/99 X |
| 4,074,330 | 2/1978 | Norton et al. | 360/102 |
| 4,167,269 | 9/1979 | Hatchett et al. | 369/261 X |
| 4,296,448 | 10/1981 | Garcia et al. | 360/135 |
| 4,375,656 | 3/1983 | Radman et al. | 360/102 |

FOREIGN PATENT DOCUMENTS

| | | |
|---|---|---|
| 0042062 | 12/1981 | European Pat. Off. . |
| 0055390 | 7/1982 | European Pat. Off. . |
| 1119186 | 6/1956 | France . |
| 2396381 | 1/1979 | France . |

Primary Examiner—Stuart N. Hecker
Assistant Examiner—Benjamin E. Urcia
Attorney, Agent, or Firm—James M. Thomson

[57] ABSTRACT

A disk cartridge file employs a cartridge which is a rigid enclosure containing a flexible information storage disk mounted on a drive hub. One wall of the cartridge comprises a central hub drive aperture and an arcuate radially extending access slot for a read/write transducer. In operation, the disk flies over the inner surface of the apertured wall on an air bearing. This surface is planar over a major portion including the access slot but has a smoothly contoured raised land bordering the slot on the downstream side thereof. When employed in combination with a transducer of the ring stabilized type which projects through the slot and penetrates into the normal path of the medium, the transducer is coupled with the medium in a stable closely spaced air bearing relationship. The raised land extends the range of penetration over which the transducer is coupled, particularly at the outer diameter of the disk.

14 Claims, 8 Drawing Figures

DISK CARTRIDGE HAVING A FLEXIBLE DISK STORAGE MEDIUM AND A DISK FILE INCLUDING SUCH A CARTRIDGE

TECHNICAL FIELD OF THE INVENTION

The present invention relates to disk cartridges for information storage having a flexible disk storage medium and to disk files including such cartridges.

BACKGROUND OF THE INVENTION

The use of flexible disk media, sometimes known as "floppy disks", for storage of magnetically recorded information is very well known. In the most common form of floppy disk file, the disk is generally enclosed in a jacket, to form a combination sometimes known as a "diskette". To record or read information, a magnetic transducing head is brought into contact with the disk medium through an access slot in the jacket and the disk is rotated by a drive mechanism at linear velocities around 3.5 meters per second.

Although cheap and reliable, the wear and performance limitations of this technology have always been recognised and several attempts have been made to develop a flexible disk system in which the disk would ride on an air bearing out of contact with both the head and any support or enclosure. This would lower wear and permit higher operating speeds. One very early step in this direction is described in an article by R. T. Pearson entitled "The Development of a Flexible Disk Magnetic Recorder" (Proc IRE, Vol. 49, No. 1, Jan. 1961, pp 164–174). In this article, it is observed that when a flexible disk is rotated in proximity to a rigid fixed plate, and ventilation is provided at the disk hub, then the disk moves toward the plate and adopts a stable form flying at a separation from the plate that decreases toward the outside diameter. The case of flat, grooved and perforated backing plates are analysed. In the described apparatus, the backing plate is part of a fixed drive mechanism and the head approaches the disk from the side opposite to the plate.

The mechanism of this type of device is notionally simple in that the disk forms a vaneless impeller accelerating the air between disk and plate tangentially. For large initial separation there is a reduction of pressure in the trapped volume according to the centrifugal pump mechanism, which moves the disk closer to the plate. Local stability is reached as the radial component of viscous drag increases with the narrowing gap and balances the local pressure gradient due to centripetal acceleration. The total flow of air and hence the gap at any radius is determined principally by the axial position of the hub with respect to the plate and the stiffness of the disk near the hub for disk thicknesses of interest in this field, the local separation is dominated by local viscous drag and is highly stable. Flow, for most configurations, is entirely laminar.

The ideal laminar flow which can be achieved over a flat continuous plate is not so easily maintained in those file arrangements where a slot is provided in the plate to permit access by the head. Both the head and the slot perturb the airflow leading to unstable head to disk spacing. This has led to the development of various non-planar plate configurations.

One such arrangement is shown in UK Pat. No. 1,542,568 where a sealed head access slot in a backing plate is bordered on both sides by smoothly contoured ridges. It is possible for the slot to be sealed because the backing plate forms part of the fixed drive mechanism and is not removable with the disk.

Another configuration of backing plate is shown in UK Pat. No. 1,525,308. In this patent, a disk cartridge is described which includes a backing plate within the cartridge. The backing plate is provided with an unsealed slot to permit head access. Entry of additional air by way of the unsealed slot is a further cause of instability. In order to overcome this the plate is bent about two chords on opposite sides of the access slot. Such a configuration gives the rotating disk greater positional stability and, thus, better quality signals from the head.

Although cartridges for the disks are clearly necessary to prevent contamination if they are to be interchanged between files, the provision of a backing plate as part of the enclosure leads to an expensive and bulky cartridge. However, the presence of a precision machined backing plate has generally proved necessary if a stable head to disk separation is to be achieved. One compromise, avoiding the expense of a machined plate in each cartridge, is shown in U.S. Pat. No. 4,400,748 in which the precision backing plate is made part of the fixed drive mechanism of the disk file and enters the cartridge only when it is loaded into the drive.

Two proposals for a flexible disk cartridge in which the disk flies directly over the inside wall of a cartridge are also known. In U.S. Pat. No. 4,159,494, a cartridge is shown which has opposite chordal bends so that the disk flies close to one wall and then the other, permitting head access from both sides. In U.S. Pat. No. 4,279,623, a cartridge is shown in which the backing surface is provided by one inner wall of the cartridge. The wall has a head access slot located in a convex raised portion of its surface. The opposite wall of the cartridge is provided with bumps to urge the disk towards the head access surface.

In the type of disk file described above, employing a backing surface over which the disk flies, the design of the head surface is also an important factor in achieving close and stable separation between head and media. The actual head transducing surface is generally part spherical in shape and may be slotted. U.S. Pat. No. 4,003,091 describes how the provision of a polished stabilising ring sealed around the head proper tends to stabilise the head/disk separation. The use of a similar stabilised head in conjunction with a backing plate is also shown in European patent application, publication No. 0064390-A1.

DISCLOSURE OF THE INVENTION

Although, as indicated above, a few proposals for disk cartridges whose inner walls provide the air bearing backing surface for an out-of-contact flexible disk have been made, none of these have proved commercially viable. Problems of disk wear and signal quality resulting from excessive variation in head to disk spacing have been found to occur. The tolerances on the backing surface which must be achieved to avoid these problems have always been found to require a precision machined backing plate.

According to the present invention, there is provided a disk cartridge for information storage having a flexible disk storage medium within a cartridge enclosure, the cartridge enclosure having a central aperture in one wall to permit external drive means to rotate the disk within the enclosure and to permit ingress of air so that the disk develops an air bearing, when rotated by the external drive means, which supports it clear of the enclosure walls, the cartridge enclosure also having an access slot in one wall which spans the information storage area of the disk and which permits access to the disk by an external air bearing transducer for recording and/or detecting information thereon, the inner wall of the cartridge which includes the access slot being planar over a major portion of its surface and having an out-of-plane feature over a minor portion of its surface, the cartridge being characterised in that the planar portion of said cartridge inner wall includes the periphery of the access slot and at least the two quadrants of the inner wall to one side of the access slot, and that the out-of-plane feature consists of a smoothly contoured raised element bordering the other side of the slot.

According to a further aspect of the invention there is also provided a disk file including such a disk cartridge, a receiver for receiving said cartridge, drive means for engaging and rotating the disk via the central aperture of the cartridge, a ring stabilised air bearing transducer, loading means for producing a relative loading motion between the transducer and cartridge so that the head enters the access slot and penetrates within the inner wall of the cartridge, the height of the element on said inner wall being less than the depth of penetration of the head.

This combination of a low element to the downstream side of the access slot together with the use of a head of the ring stabilised type enables the disk to fly over the head in stably coupled fashion at all disk diameters within an adequate range of tolerance of head penetration. Without the wall element the stable coupling range, particularly at the outside diameter of the disk is insufficiently wide to lie within the normal range of positional tolerance of a moulded cartridge wall. The head to disk separation of an uncoupled system is greater than that of a coupled system and is unstable.

Although the wall element is preferably confined to the quadrant of the wall on the downstream side of the access slot, it would be possible for it to extend further providing at least two planar quadrants of the wall remain for instabilities to die away.

The precise form of the element depends to some extent on the thickness and properties of the disk medium but, generally, it has been found preferable that it does not extend further towards the cartridge centre than the innermost extent of the access slot. This prevents excessive distortion of the disk which could eventually lead to contact. The preferred maximum height of the element is in the range 0.1 to 1.0 mm.

It is important that the element should border the downstream side of the access slot quite closely and it is preferred that its leading edge should rise relatively sharply to its full height over a distance of not more than the width of the slot.

For thinner media, it is preferred that the element is in the form of a plateau extending circumferentially at full height over at least 60° of the cartridge wall. In this case, it has also been found preferable that the inner edge of the plateau should not follow a line which is concentric with the disk, in order to minimise wear. It has also been found that stability can be improved slightly, at the outer diameter, if the leading edge of the plateau, at its outermost point, curls round the outer tip of the access slot. Finally, it is preferred that the trailing edge of the plateau should be relatively less steep than the leading edge.

For standard media thickness ("3 mil"), it has been found preferable to employ an element meeting the above general constraints but which is in the form of a spur extending circumferentially over no more than 20° of the inner wall of the cartridge.

Although the invention has been disclosed in terms of a magnetic recording medium, it will be realised that optical and other forms of storage using thin flexible disk media can also make use of the invention.

The foregoing and other objects, features, and advantages of the invention will be apparent from the following more particular description of the preferred embodiments of the invention, as illustrated in the accompanying drawing.

BRIEF DESCRIPTION OF THE DRAWINGS

The invention will now be described, by way of example, with reference to the following drawings in which.

DETAILED DESCRIPTION

Figure 1:
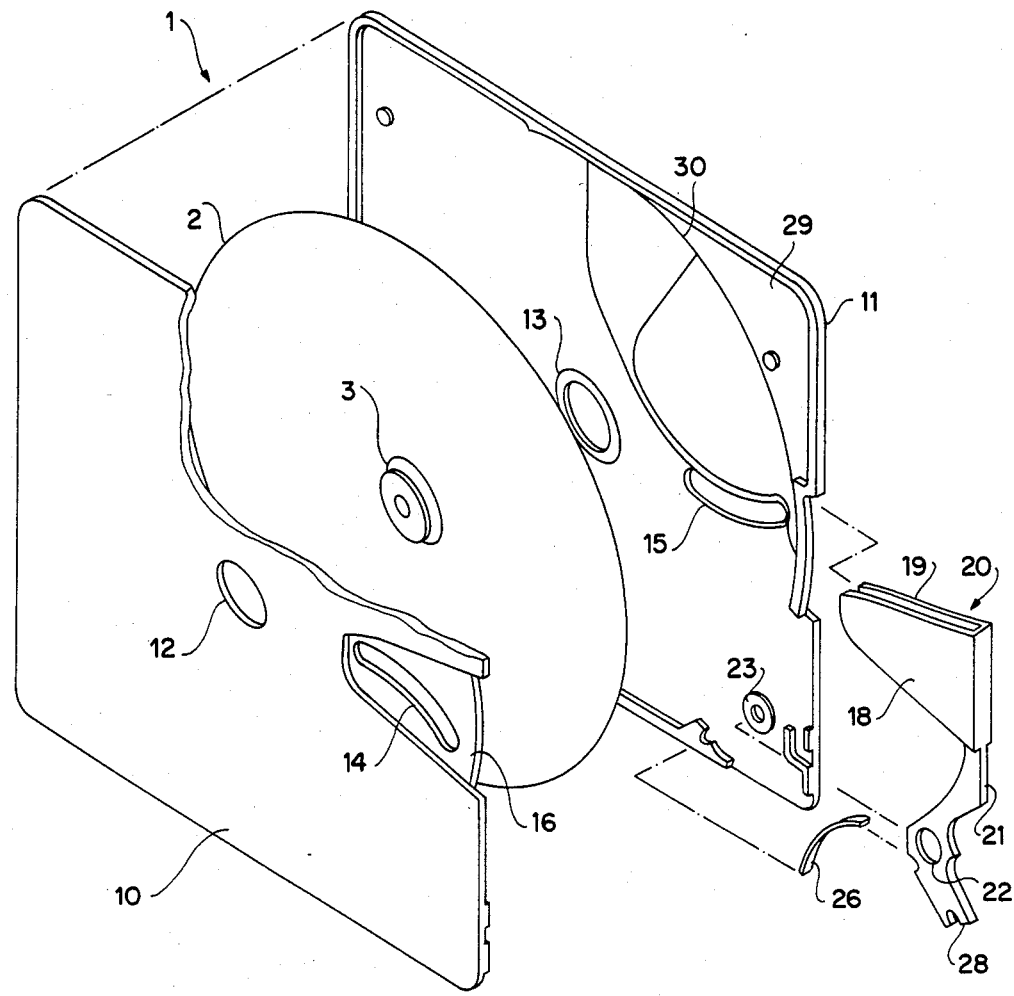
FIG. 1 shows an exploded and partly broken away isometric view of a disk cartridge according to the invention.

A disk cartridge 1 according to the invention is shown in exploded and partly broken away form in FIG. 1. The cartridge is intended to be loaded into and to cooperate with the drive mechanism of FIG. 2 to form a disk file according to the invention.

Figure 2:
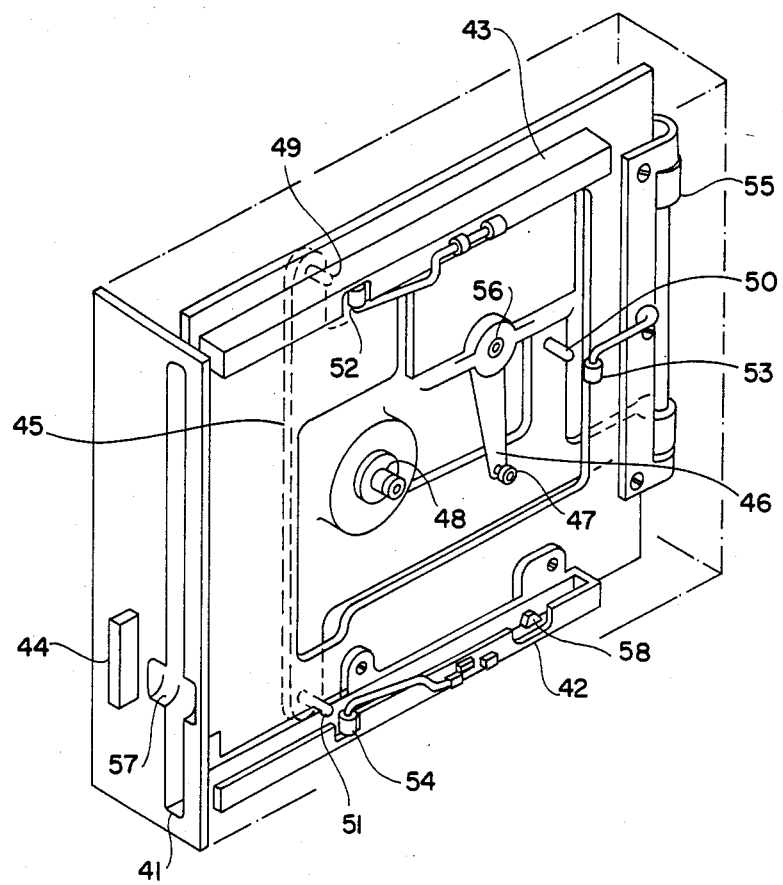
FIG. 2 shows an isometric view of a disk drive mechanism for receiving the cartridge of FIG. 1 to form a disk file according to the invention.

As shown in FIG. 1, a flexible magnetic disk 2 comprising a drive hub 3 of magnetisable material, is enclosed between the two walls 10 and 11 of the cartridge 1. The drive hub is centred on holes 12 and 13. Hole 13 permits a magnetic chuck 48 (FIG. 2) to engage the hub and rotate the disk. An arcuate head access slot 15 in the wall 11 permits access to the disk by a magnetic head 47 (FIG. 2). A similar slot 14 is provided in wall 10.

Surrounding the slot 15 on the outer face of wall 11 is a relieved area (not visible). An identically shaped relieved area 16 is also provided on the outer face of the wall 10 surrounding slot 14. The shape of these relieved areas is complementary to the shape of each plate 18, 19 of a double shutter 20. When the cartridge is not in use, the shutter plates 18 and 19 locate in the relieved areas so that they cover the slots 14 and 15.

The shutter also includes a crank 21 which is mounted by means of an extended hole 22 on a pivot 23, in one corner of the cartridge. The shutter is opened and closed by pivotal movement about pivot 22 and is positively latched in both open and closed positions by a leaf spring 24. The insertion of the cartridge into the drive opens the shutter, against the action of the spring, as toothed portion 28 on the opposite end of crank 21 engages a fixed protuberance in the drive.

As shown, the inner face of the cartridge wall 11 is provided with a raised element 29 immediately behind the access slot 15. The element 29 is in the form of a plateau, less than 1 mm in height, which extends for approximately 60° about the axis of the disk. A gentle trailing edge portion 30 of the plateau gradually falls to the plane of the remainder of the inner surface of wall 11. The precise form of the plateau 29 and its effect on the operation of the file is described further in connection with FIGS. 5 to 7.

The walls 10 and 11 are substantially identical in shape, though slight differences exist in the portions forming part of the shutter mechanism. This was originally intended to enable operation of the cartridge in either orientation with head access from either side and was also convenient for fabrication. However, in the arrangement shown the hub 3 is so shaped that the disk 2 is offset in the cartridge to be close to wall 11 and spaced from wall 10. The provision of the corresponding apertures 12 and 14 in wall 10 appears to be beneficial in that the venting effect in operation diminishes any tendency of the disk to be attracted away from wall 11 towards wall 10.

Turning now to FIG. 2, the drive mechanism of the disk file is shown in isometric form with certain details omitted for simplicity. The cartridge 1 of FIG. 1 is inserted into the drive mechanism by way of a receiver slot 41. The cartridge locates in guide rails 42 and 43 and is oriented with its wall 11 facing inwardly towards the main body of the drive mechanism. As the cartridge is pushed fully home, the toothed portion 28 of the shutter crank 21 engages a fixed projection 58 at the right hand extremity of rail 42 and the shutter 20 is opened to reveal the head access slot 15.

Lever 44 is then rotated through 90° clockwise. This, firstly, blocks slot 41, preventing accidental cartridge removal, and, secondly, loads main drive chassis 45 onto the cartridge. The chassis is pivotally mounted on hinge 55 at the rear of the drive and linked to the lever 44 by a suitable crank mechanism (not shown).

Figure 3:
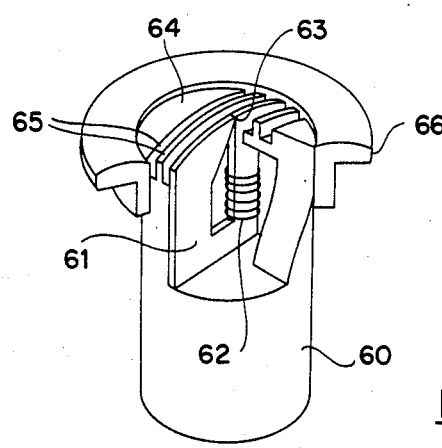
FIG. 3 shows a ring stabilised transducer employed in the drive mechanism of FIG. 2.

Mounted on the drive chassis is a head actuator for rotating a head-support arm 46 about bearing 56. The actuator is of the electromagnetic swinging arm type as further described in U.S. Pat. No. 4,286,298. The end of arm 46 supports a magnetic head 47 of the ring stabilised type, as shown in FIG. 3, which registers with the head access slot 15 of the cartridge.

Also mounted on the chassis 45 is a disk drive motor and magnetic chuck assembly 48. The chuck registers with the hub access hole 13 in wall 11 to engage the magnetisable hub 3 of disk 2. In this way the disk can be rotated within the cartridge by the drive motor assembly 48. The drive motor is of the dc brushless type.

Three cartridge locating datum pins 49, 50 and 51 engage corresponding depressions in the cartridge as the chassis is rotated about hinge 55. Spring rollers 52, 53 and 54 urge the cartridge against the datum pins. In this way the cartridge is precisely located on the chassis in relation to the drive components. In this condition, the recording head 47 protrudes through the head access slot beyond the plane of wall 11 by a predetermined amount of approximately 0.5 mm.

To remove the cartridge from the file the lever 44 is returned to the position shown in FIG. 2 so that the edge of the cartridge may be gripped manually at finger hole 57 to allow it to be pulled out.

The recording head 47 is shown in more detail in FIG. 3. The head comprises a ceramic post 60 formed with a slotted end in which is bonded a thin ferrite magnetic core 61, wound with a coil 62. The end of the core containing the read/write gap 63 is lapped together with the surrounding ceramic to form a generally spherical air bearing surface 64. To reduce the overall air bearing surface area and thus permit a closer approach of head and disk, the ceramic post end is further provided with slots 65. The final component of the head is a stabilising ring 66, bonded to the post around the air bearing surface 64. Further detail of the manufacture of such a head may be found in U.S. Pat. No. 4,293,883.

As described in the earlier referenced U.S. Pat. No. 4,003,091, the function of the stabilising ring is further to stabilise the separation of the disk from the head, in addition to the primary stabilisation provided by a backing plate which, in the present case, is constituted by the inner surface of cartridge wall 11. The ring isolates the head from the inevitable mechanical tolerance between the backing surface and the movable head assembly so that the disk is presented to the head from a very well defined reference frame attached to the head. The final control of disk separation from the read write gap 63 is provided by the air bearing action of surface 64.

The action of the ring stabilised head when penetrated into a moving flexible medium is to attract the medium onto the head until the attractive force is balanced by the air bearing generated by the spherical surface surrounding the read/write gap. This condition which is relatively stable is referred to as the "coupled condition". Test signals read from a flexible medium in the coupled condition show little amplitude variation, indicating a constant head separation. It has been found that the combination of a ring stabilised head with a backing plate improves the range of head penetration positions in which the coupled condition is maintained. This range will be referred to as the "coupling range".

Figure 4:
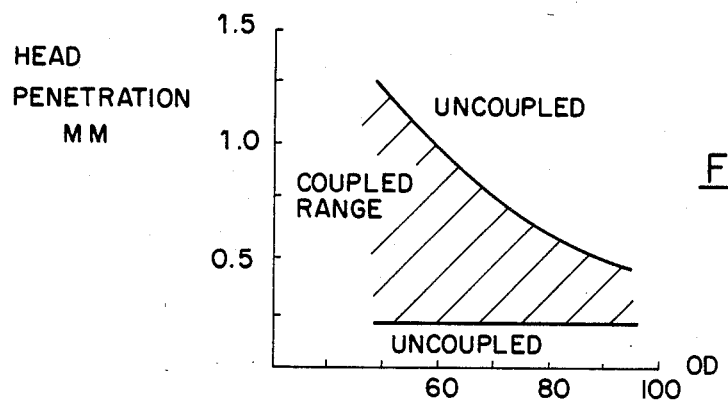
FIG. 4 shows the variation of head to disk coupling range with disk radius in a file employing a planar backing plate in combination with a ring stabilised head.

The results of some experiments with planar backing plates are shown in FIG. 4. These indicate that the upper limit of the coupling range decreases markedly with increasing radial distance of the head from the axis of rotation. Whereas at the inner radii, the head may penetrate from 0.2–1.2 mm beyond the plane of the backing plate and still be coupled to the medium, at the outermost positions the coupling range is reduced to 0.2–0.5 mm. This decreased coupling range determined the tolerances within which the head and backing surface had to be manufactured and positioned. Only by employing a precision machined backing plate could they be met in a disk file capable of being produced commercially.

Figure 5:
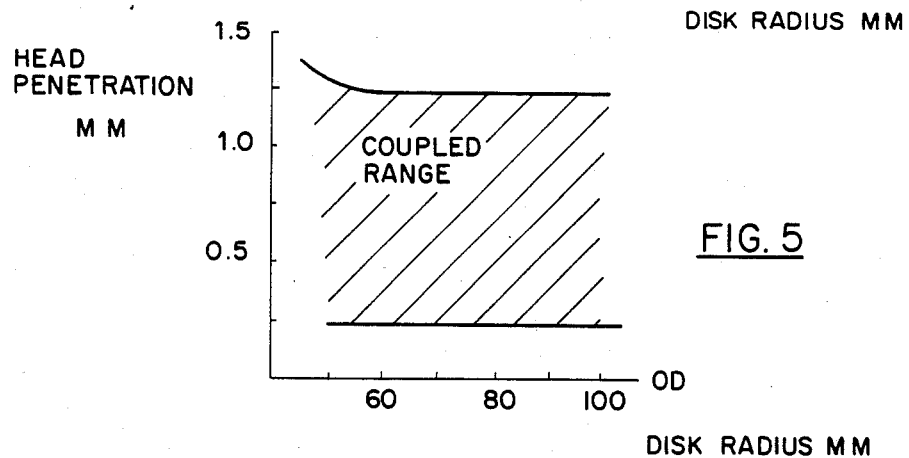
FIG. 5 shows the variation of head to disk coupling range with disk radius in the file of FIGS. 1 to 3.
Figure 6:
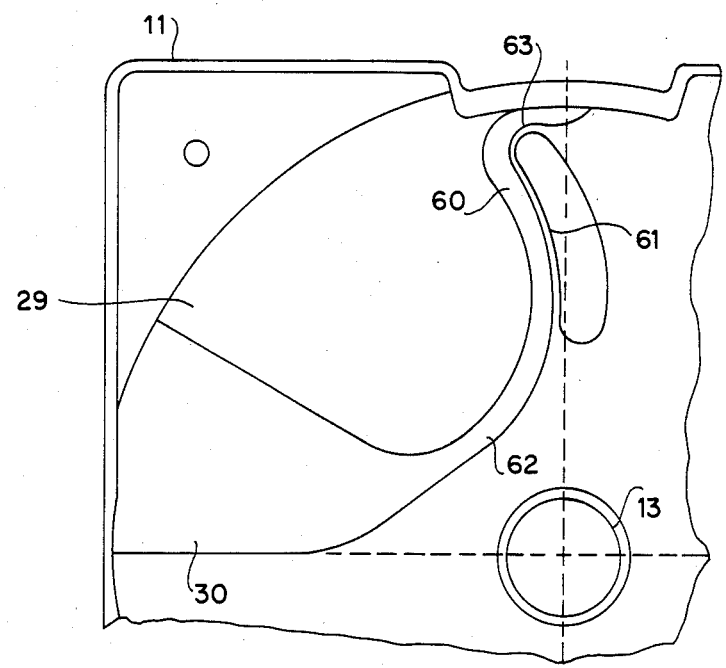
FIG. 6 shows a plan view of a portion of the inner wall of the cartridge of FIG. 1, which includes a raised element
Figure 7:
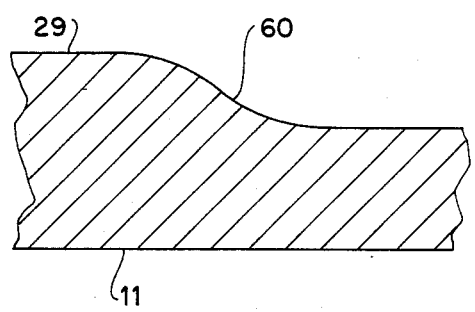
FIG. 7 shows a section through the leading edge of the raised element of the cartridge wall illustrated in FIG. 6.

However, as shown in FIG. 1 and further in connection with FIGS. 6 and 7, the provision of the low element 29 immediately behind the head access slot 15 has been found to extend the upper limit of the coupling range at large radii as shown in FIG. 5. With an extended coupling range of 0.2–1.2 mm at all radii, it has proved possible to dispense with a machined metal backing plate and to use instead the inner wall surface of the cartridge 1. The inner wall of the cartridge does not need to be machined to produce the desired element shape. The necessary shape can be formed to a sufficiently high tolerance as part of the process of injection moulding the cartridge wall 11 from Polybutylene terephthalate plastics material.

The precise reasons why the coupling mechanism breaks down more easily with a flat backing surface than with a backing surface having a non-planar feature such as element 29 are not fully understood. However, one possible explanation is as follows.

When any bluff object is moved into proximity with a rapidly moving flexible membrane, an air bearing is formed which tends to repel the membrane at its leading side and attract it at its trailing side. The combined effect of the two counteracting forces is to cause the membrane to fly at some small distance from the object and to be subjected to a torque which causes it to be lifted at the front and depressed at the rear. The closeness of flying is determined by the contour of the object (a sharp object flies closer) and the net load force caused by the external constraints on the membrane.

The stabiliser and head form effectively three closely spaced objects. The leading side of the stabiliser ring supports an applied load caused by the disk being deflected away from the backing plate by the penetration of the head above the normal flying height (about 0.2 mm). This causes the medium to be thrust onto the central read/write head by the torque created in supporting the applied load. The head in turn supports the load caused by this downward thrust at the rear of the leading stabiliser and similarly produces a small downward thrust on the trailing stabiliser. The trailing stabiliser supports this load, effectively peeling the medium off the rear of the head itself, and deflects the trailing side of the medium downward. Given this system of counter acting forces, the conditions for coupling of the medium with the head/stabiliser in combination can be stated as follows.

The medium approaching the head/stabiliser must be externally constrained to apply a force onto the leading side of the stabiliser. This condition is met when the head is penetrated through the backing plate by an amount that exceeds the natural flying height of the medium across the plate.

The second condition is that the external constraint on the medium on the trailing side of the head/stabiliser must not overpower the small downward force that the central portion of the head applies to the leading side of the trailing stabiliser.

The first of these two conditions determines the lower bound of the coupling range, illustrated in FIGS. 4 and 5, which, it can be seen, is approximately constant at 0.2 mm.

The second condition determines the upper bound, in a manner which requires an explanation of the mode of operation of the backing plate.

The gap between the disk and the plate is a centrifugal fan. For a large separation of the disk from the plate, air is exhausted reducing the pressure under the medium which consequently deflects toward the plate. As the spacing grows smaller, the viscous resistance to outward air flow increases and the disk stabilises at a height at which the radial pressure gradient due to the centrifugal effect on the mass of the contained air is balanced by the radial pressure gradient due to the viscous drag on the outward flowing air. Under these conditions the pressure of the air at any point under the disk is atmospheric, or more exactly differs from atmospheric only by the tiny amount necessary to maintain the slightly deflected shape of the very flexible medium. Local disturbances or any tendency to instability are strongly damped by the local stiffness of the disk, the continuity of air flow, and by the form of the Navier-Stokes equations that govern air flow in small gaps. A strong tendency to maintain constant flying height between disk and plate for a given radius therefore exists to an extent that the disk will fly at constant height over perturbations that the disk can reasonably be expected to conform to, such as radial or chordal bends.

Local to a penetrated head, it is possible for the medium to be deflected substantially away from the disk and inside the "bell tent" that is formed air can circulate and either enter or leave the system through the access slot in the plate, which is not sealed. In fact, air enters the system at this slot and is entrained by the disk leaving it at a slightly elevated height above the plate after passing the head and slot. This is the source of the great majority of air exhausted at the outer diameter of the disk but, away from the head, the balance of radial viscous and centrifugal forces determines the behaviour.

However, when the head is near the disk outer diameter and penetrates significantly through the plate the continuity of radial flow on which the balance described above depends can break down. The bell shaped tent can break out to the outside diameter and permit the wholesale entry of air which because it has not yet achieved any tangential velocity is not yet subject to centrifugal acceleration. The net effect is the formation of a bag of air behind the head which can extend up to 25 mm radially inward and trails for about 50 mm or more circumferentially. In this bag the air picks up tangential speed from the disk and is eventually centrifugally exhausted again.

The significance of this bag is that it neutralises the tendency of the disk behind the head to be drawn back onto the plate and can apply a negative force or lifting force to the trailing stabiliser. The second condition for medium coupling to the head/stabiliser is no longer satisfied when this occurs and coupling breaks down. This mechanism is the reason for the decreasing upper limit of coupling on a flat backing plate as the outside diameter is approached.

The effect of providing element 29, FIGS. 1 and 6, is to contour the plate so that it conforms more nearly to the shape that the medium adopts when the head is near the outside of the disk with moderate penetration. This greatly reduces the tendency of the medium to lift away from the plate behind the head and conversely, if it has lifted clear, reduces the space into which air can flow from the outside and enhances the rate of tangential acceleration, thereby promoting coupling at high head penetration. Providing that a reasonably smooth form is used, this contour has no adverse effect when the head is not near the disk outer diameter. The improvement to the range of coupling that can be obtained is illustrated in FIG. 5. The maximum penetration at which coupling is maintained at the outer diameter is increased by an amount roughly equal to the height to which the plate surface behind the head access slot is raised above the level before the slot. The distance over which the plate level is brought back to the flat does not affect the coupling range significantly providing that the transition is made smoothly.

Further detail of the contoured portion of the cartridge wall 11 is shown in FIGS. 6 and 7. In FIG. 6 a portion of wall 11 of the cartridge 1 is shown including the hub centring hole 13, the head access slot 15 and the contoured portion including element 29 and trailing edge 30. The plateau portion of element 29 extends through an arc of less than 90° and is shown in the figure as about 60° and the trailing edge occupies an arc of 30° about the hub centre 13. The height of the plateau was 0.37 mm which was found approximately to correspond to the increase in coupling range at the outer diameter.

The edges of the element which are covered by the disk are smoothly blended into the bordering planar surface of the cartridge wall. The leading edge 60 as shown in FIG. 7 borders the slot 15 very closely and rises smoothly but relatively sharply over a distance slightly less than the width of the slot. The actual downstream edge 61 of slot 15, however, lies in the plane of the remaining portion of cartridge wall 11. It was found empirically that curling the leading edge 60 around the outer edge of the slot and slightly upstream thereof, as shown at 63, marginally improved stability at the outer edge.

The inner edge 62 is also of the same double radius as the leading edge 60 until it blends with the more gentle curvature of trailing edge 30. It was found empirically that the inner edge 62 should not extend too close to the hub centring hole 13 or the disk could not conform to the shape and would not fly smoothly. It was also found that edge 62 should not run concentrically around hole 13 to avoid a collapse of the air bearing and consequent contact along the edge.

Moving the leading edge 60 too close to the head access slot 15 was found to cause loss of the lower end of the coupling range and moving it too far back from the slot caused loss of the top of the range. Reducing the angular extent of the plateau also gradually reduced the coupling range top end. It should, however, be understood that the 60° extent shown was found to be the optimum for the particular thickness of medium used (38 microns) in the cartridge of FIG. 1.

Figure 8:
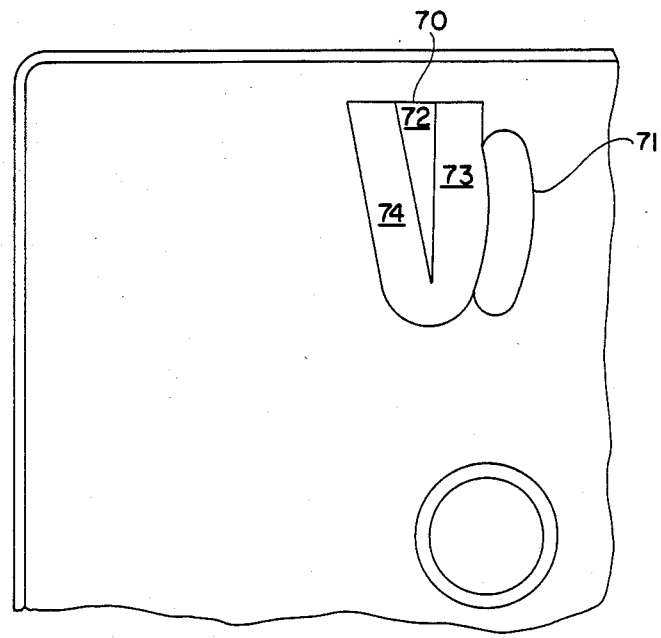
FIG. 8 shows a cartridge wall portion having an alternative form of raised element suitable for a disk medium of different thickness.

For a thicker medium (76 microns), the optimum shape of the element can be altered considerably as shown in FIG. 8. This element 70 again borders a head access slot 71 but is more in the form of a spur. The spur has a small plateau region 72 of height 0.3 mm and has leading and trailing edges, 73 and 74, of identical relatively sharp double radii which blend the plateau 72 to the plane of the cartridge wall. The angular extent of the whole spur 70 about the disk centre is about 20°.

While the invention has been particularly shown and described with reference to preferred embodiments thereof, it will be understood by those skilled in the art that various changes in form and details may be made therein without departing from the spirit and scope of the invention.

What is claimed is:

1. A disk cartridge for information storage having a flexible disk storage medium within a cartridge enclosure having a first wall and a second wall, said cartridge enclosure having a central aperture through one of said walls to permit external drive means to rotate said disk within said enclosure and to permit an ingress of air into said enclosure so that said disk develops an air bearing when rotated by said external drive means, said air bearing supporting said disk clear of said walls of said enclosure, said enclosure having an access slot in said first wall of said enclosure, said access slot spanning an information storage area of said disk and permitting an external air bearing transducer access to said disk for recording and/or detecting information on said disk, said first wall of said cartridge being planar over a major portion of its surface of said first wall and having an out-of-plane feature over a minor portion of the surface of said first wall, wherein said planar portion of said first wall includes part of the periphery of said access slot and a substantial portion of said first wall on a first side of said access slot, and said out-of-plane feature consists of a smoothly contoured raised element bordering on a second side of said slot.

2. A disk cartridge as claimed in claim 1 wherein said disk rotates, when recording and/or detecting information, in a direction such that said information storage area traverses said planar portion prior to traversing said access slot.

3. A disk cartridge as claimed in claim 2, wherein said element bordering said second side of said access slot rises at an acute angle to full height over a distance less than the width of said access slot.

4. A disk cartridge as claimed in claim 2, wherein said element forms a plateau extending circumferentially of said disk at full height for less than 90° and an edge of said element bordering said second side of said slot rises at an acute angle to full height of said plateau over a distance less than the width of said access slot, said edge constituting a leading edge of said element and extending substantially around an outer portion of said access slot.

5. A disk cartridge as claimed in claim 2, wherein said element is in the form of a spur extending circumferentially over no more than 20° of said first wall of said cartridge.

6. A disk cartridge as claimed in claim 2 in which said element extends towards said central aperture substantially no further than said access slot.

7. A disk cartridge as claimed in claim 6, wherein said element extends above said plane in a range between 0.1 to 1.0 mm.

8. A disk cartridge as claimed in claim 6 wherein said element forms a plateau extending circumferentially of said disk at full height for less than 90° and an edge of said element bordering said second side of said slot rises at an acute angle to full height of said plateau over a distance less than the width of said access slot.

9. A disk cartridge as claimed in claim 8 wherein said plateau has a perimeter which is not concentric with an axis of said disk and extends substantially around an outer portion of said access slot.

10. A disk cartridge as claimed in claim 2 in which said planar portion of said first wall includes at least two quadrants of said first wall on said first side of said access slot and said land is contained within one quadrant of said first wall adjacent said second side of said slot.

11. A disk cartridge as claimed in claim 10, wherein said element forms a plateau extending circumferentially of said disk at full height for over at least 60°.

12. A disk cartridge as claimed in claim 1 in which said planer portion of said first wall includes at least two quadrants of said first wall on said first side of said access slot and said element is contained within one quadrant of said first wall adjacent said second side of said slot.

13. A disk cartridge as claimed in claim 1 wherein said element forms a plateau extending circumferentially of said disk at full height for less than 90° and an edge of said land bordering said second side of said slot rises at an acute angle to full height of said plateau over a distance less than the width of said access slot.

14. A disk cartridge as claimed in claim 1, wherein said element extends substantially around an outer portion of said access slot.

* * * * *